United States Patent
Skaf

(10) Patent No.: US 9,689,370 B2
(45) Date of Patent: Jun. 27, 2017

(54) APPARATUS FOR CONVERTING WAVE MOTION ON A BODY OF WATER INTO ELECTRICAL POWER

(71) Applicant: Robert Georges Skaf, Thunder Bay (CA)

(72) Inventor: Robert Georges Skaf, Thunder Bay (CA)

( * ) Notice: Subject to any disclaimer, the term of this patent is extended or adjusted under 35 U.S.C. 154(b) by 173 days.

(21) Appl. No.: 14/802,371

(22) Filed: Jul. 17, 2015

(65) Prior Publication Data

US 2015/0337795 A1    Nov. 26, 2015

Related U.S. Application Data

(63) Continuation-in-part of application No. 14/465,899, filed on Aug. 22, 2014, now Pat. No. 9,416,765.

(30) Foreign Application Priority Data

Oct. 4, 2013   (CA) ...................................... 2829362
Oct. 3, 2014   (WO) ................ PCT/CA2014/000720

(51) Int. Cl.
   *F03B 13/18*     (2006.01)
   *F03B 13/20*     (2006.01)
(52) U.S. Cl.
   CPC ............ *F03B 13/185* (2013.01); *F03B 13/20* (2013.01); *F05B 2240/40* (2013.01); *F05B 2260/4022* (2013.01); *Y02E 10/38* (2013.01)

(58) Field of Classification Search
   CPC   F03B 13/185; F03B 13/20; F05B 2260/4022; Y02E 10/38
   See application file for complete search history.

(56) References Cited

U.S. PATENT DOCUMENTS

2010/0283249 A1*   11/2010   Harden ................. F03B 13/141
                                                                 290/53
2011/0185719 A1*    8/2011   Beane ................... F03B 13/182
                                                                 60/497
2011/0187101 A1*    8/2011   Beane .................... F03B 13/20
                                                                 290/42

FOREIGN PATENT DOCUMENTS

JP              2012237300 A   * 12/2012

* cited by examiner

*Primary Examiner* — Audrey K Bradley
(74) *Attorney, Agent, or Firm* — Ted Masters

(57) ABSTRACT

Apparatus for converting wave motion on a body of water into electrical power includes an electrical power generating system. The system includes a floatable housing. An electrical power generating unit is disposed within the floatable housing. The electrical power generating unit includes two spaced apart wheels which are connected by a drive element, and at least one generator for generating electrical power. A weight is connected to the drive element. When the system is tilted by wave motion, the weight moves toward the lower wheel, thereby turning the wheels and generator(s) and creating electrical power. In an embodiment, two weights are combined to provide drive element movement in a single direction. In another embodiment, the weight travels along a track which has two upturned ends.

3 Claims, 13 Drawing Sheets

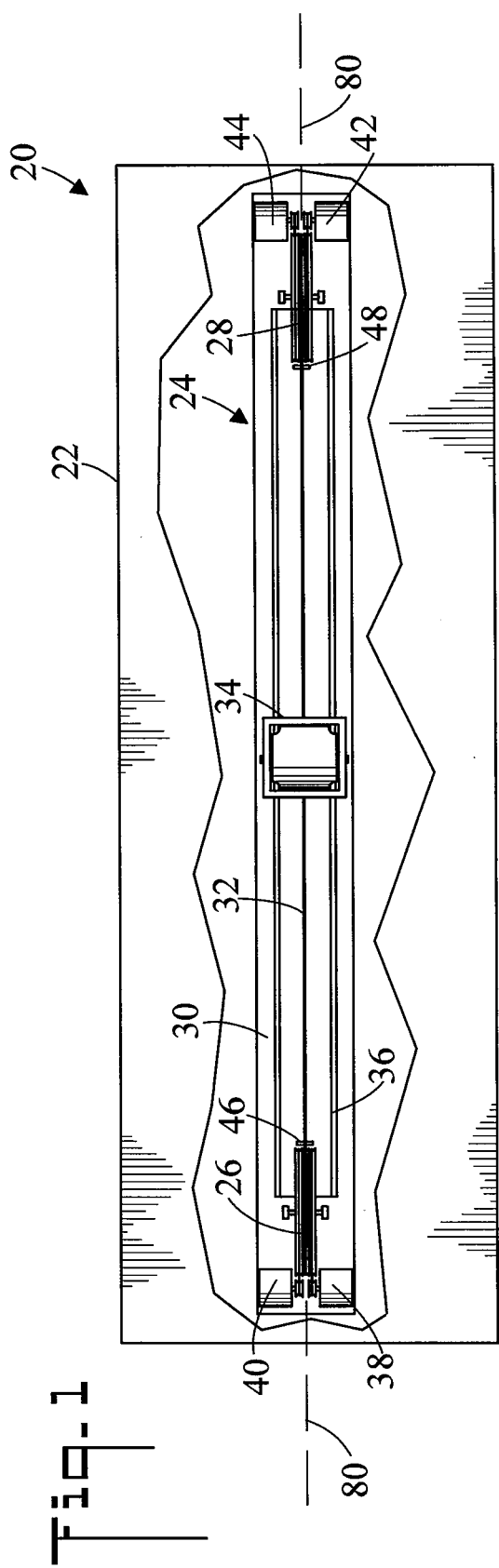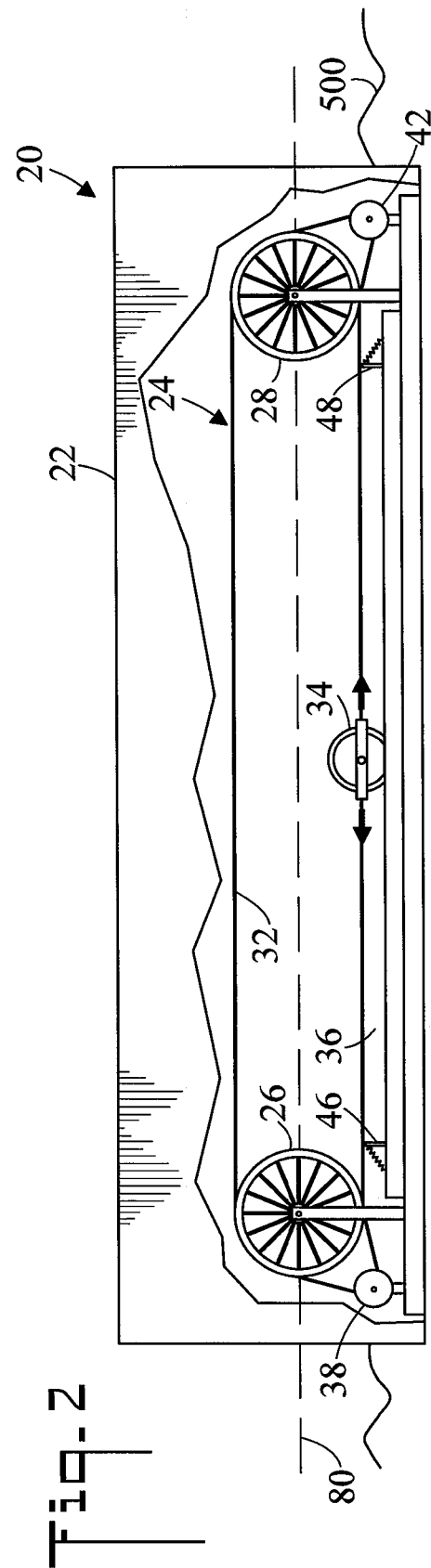

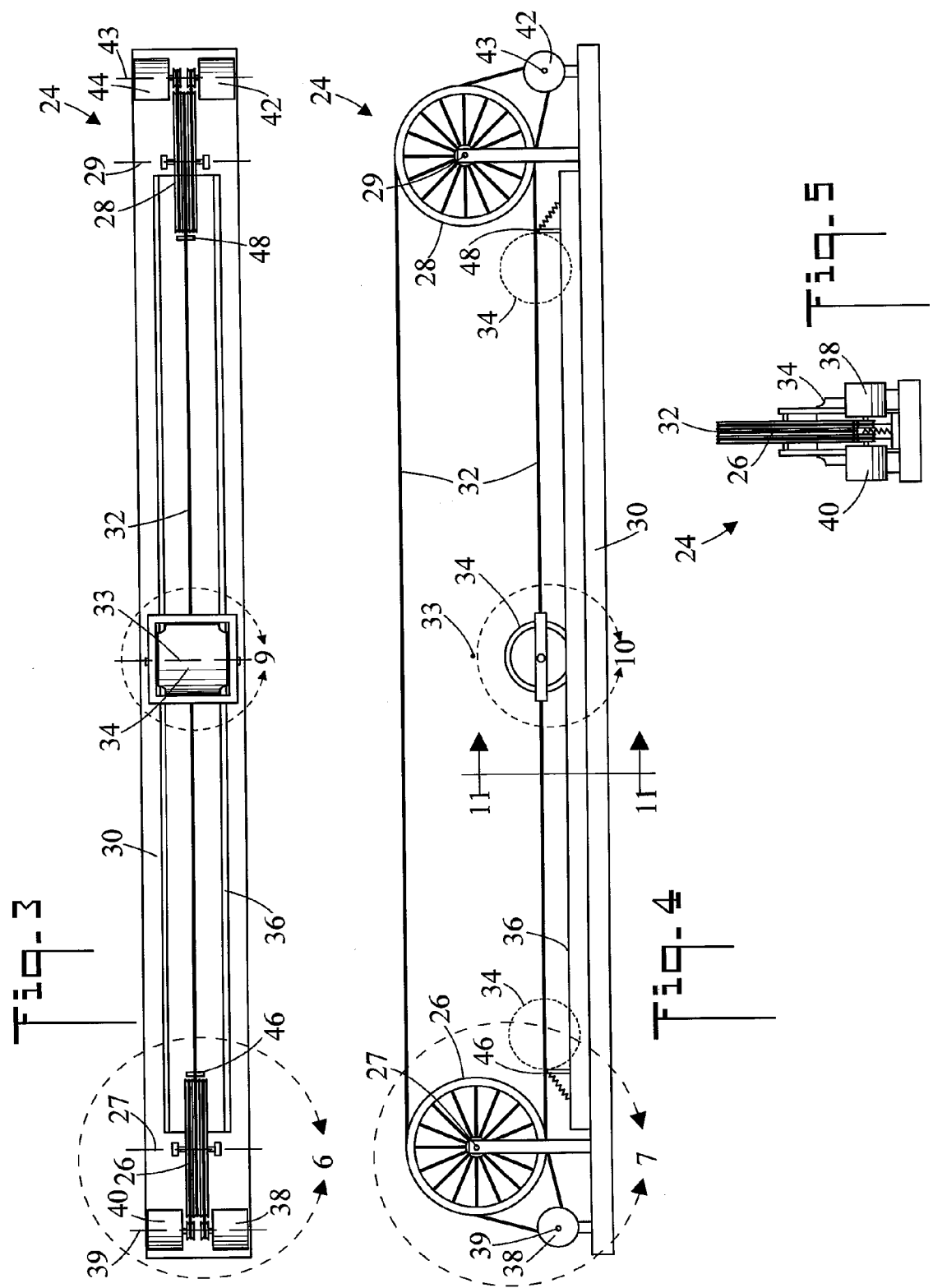

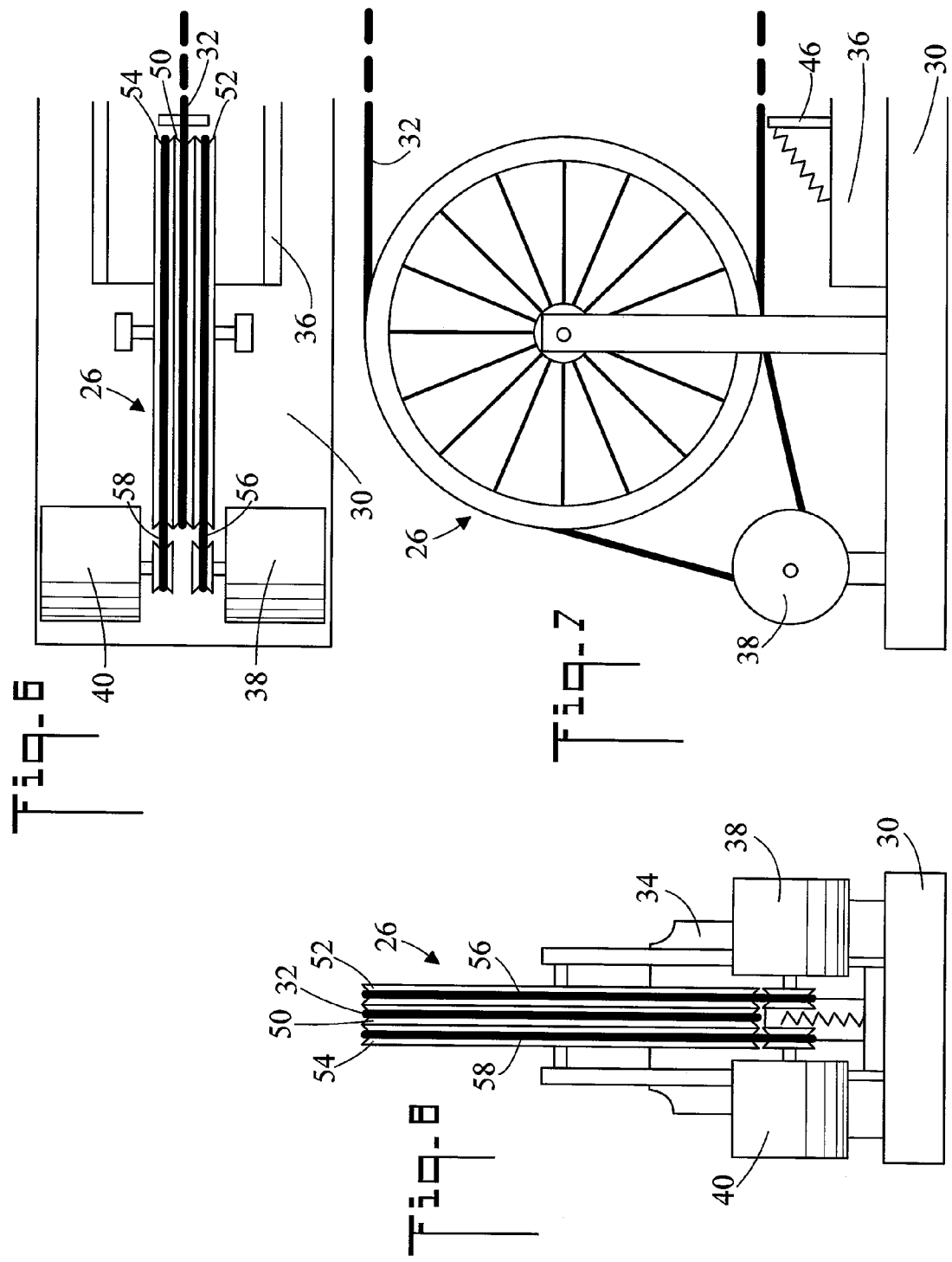

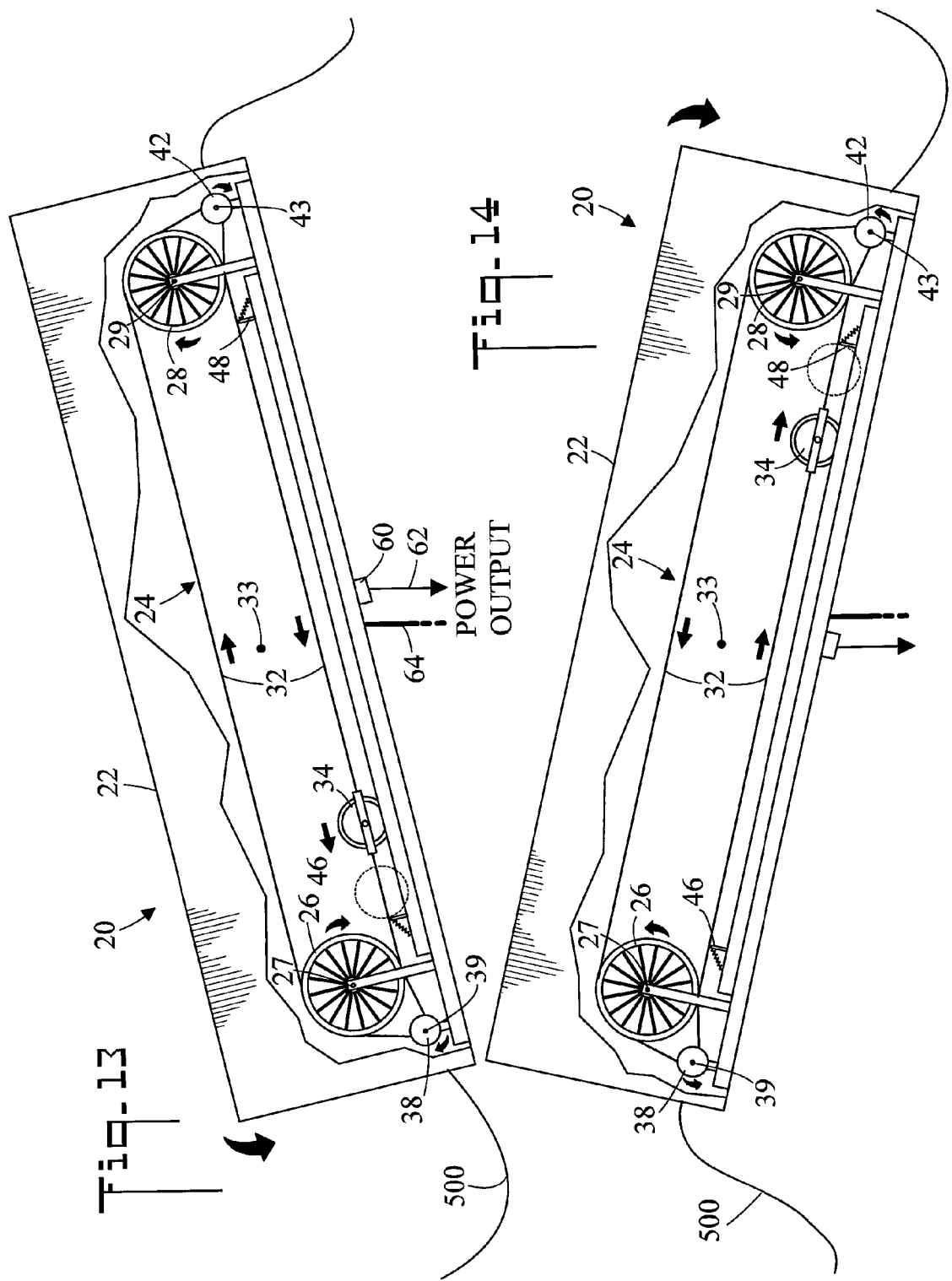

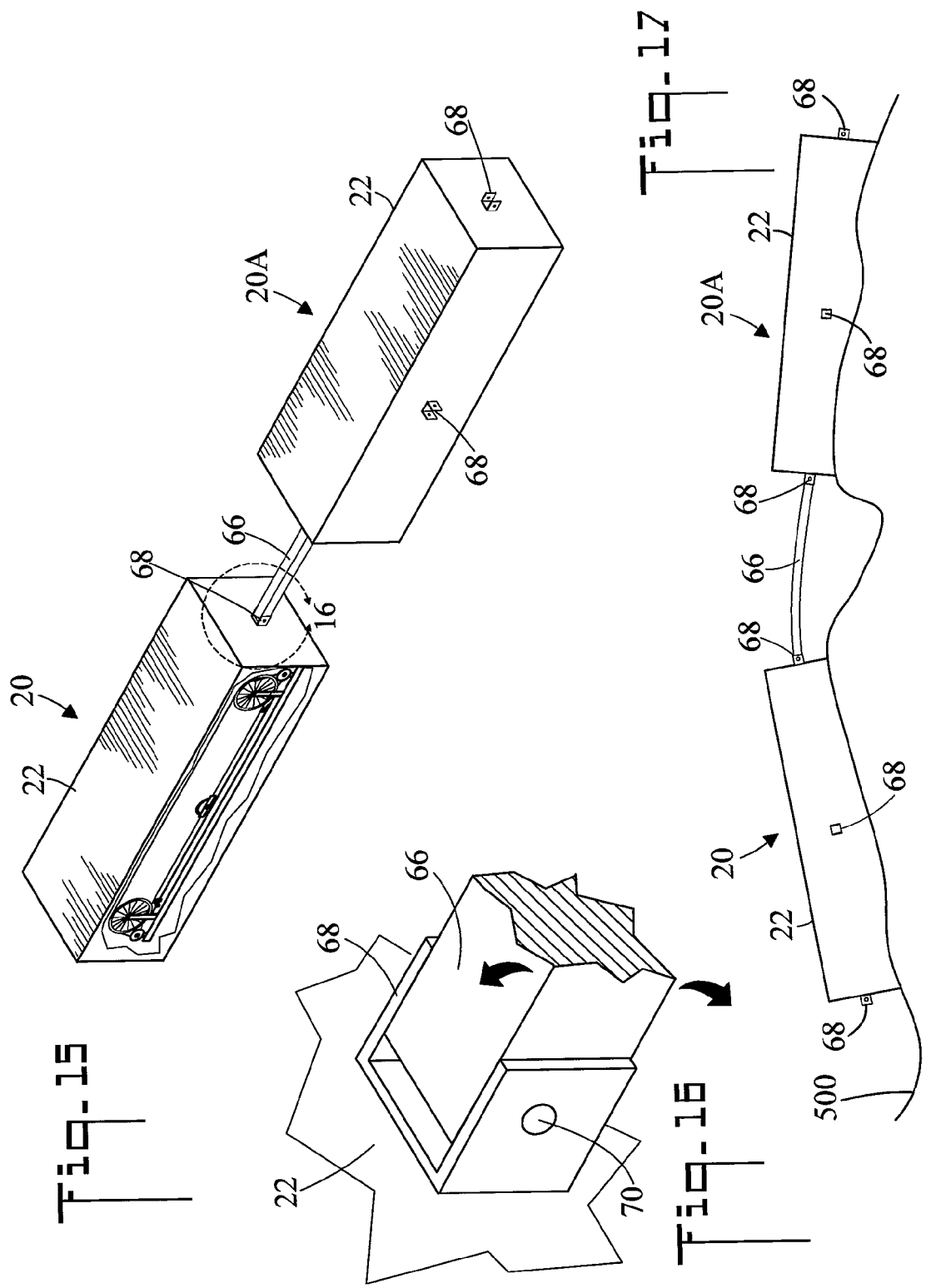

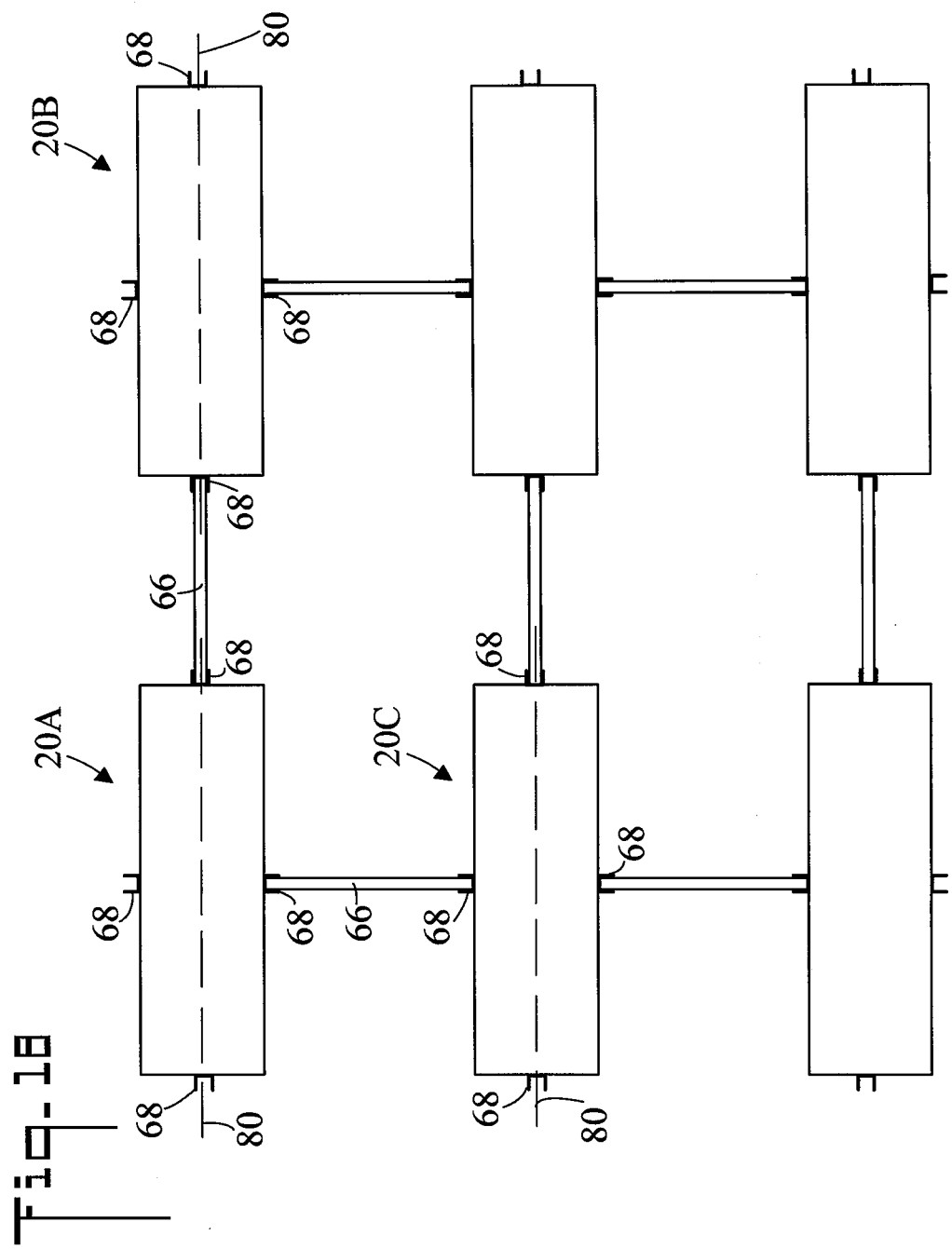

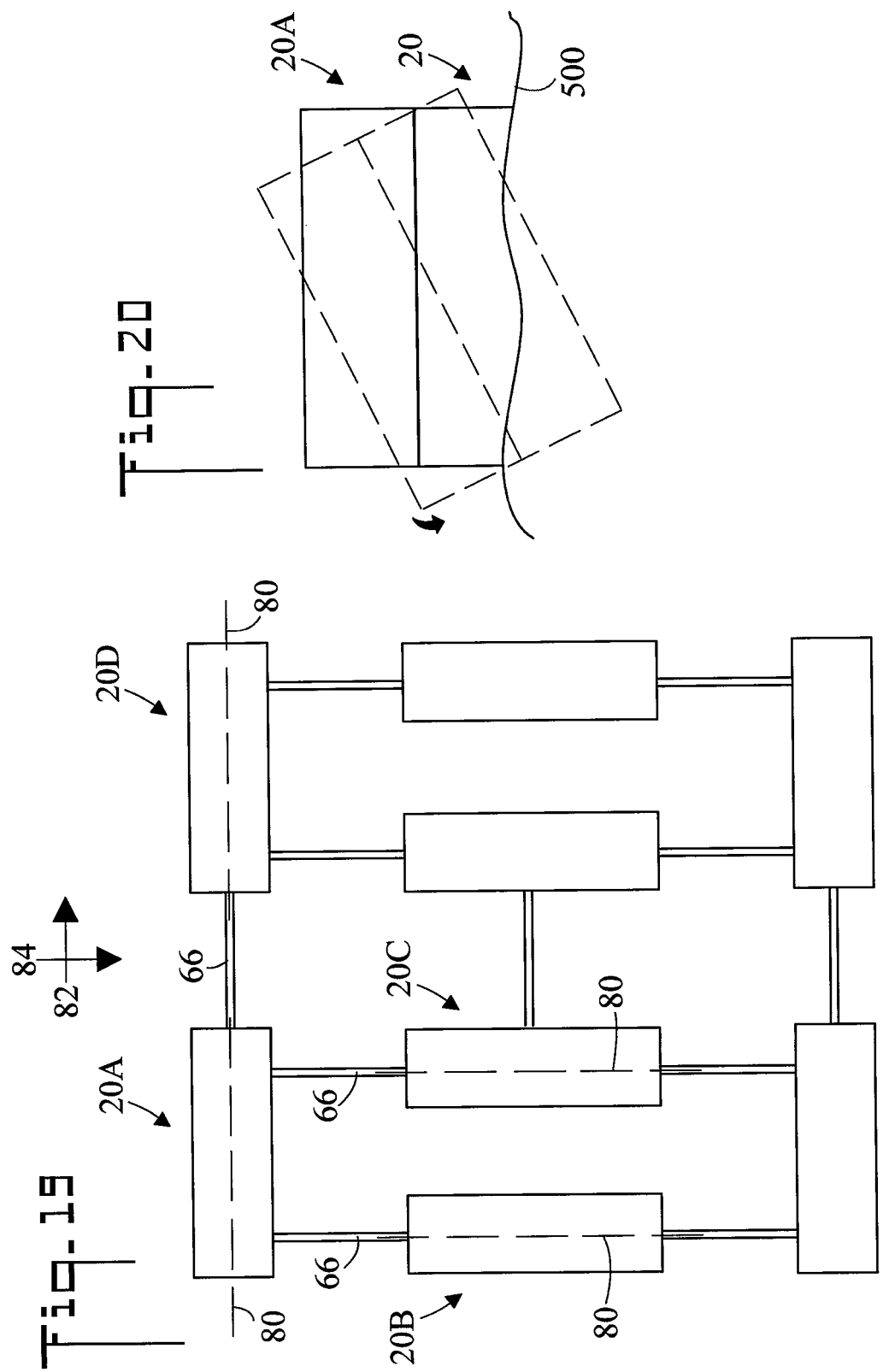

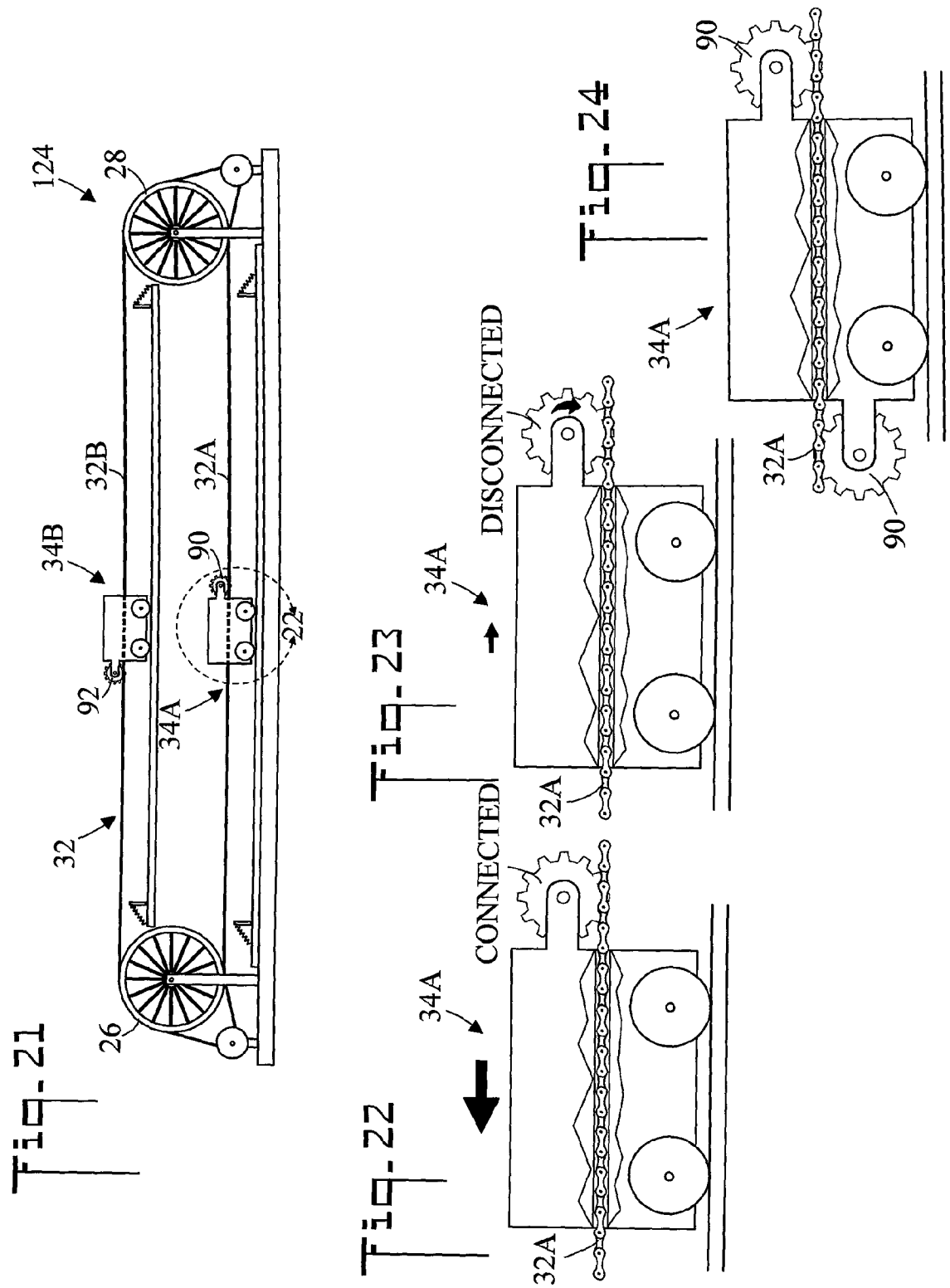

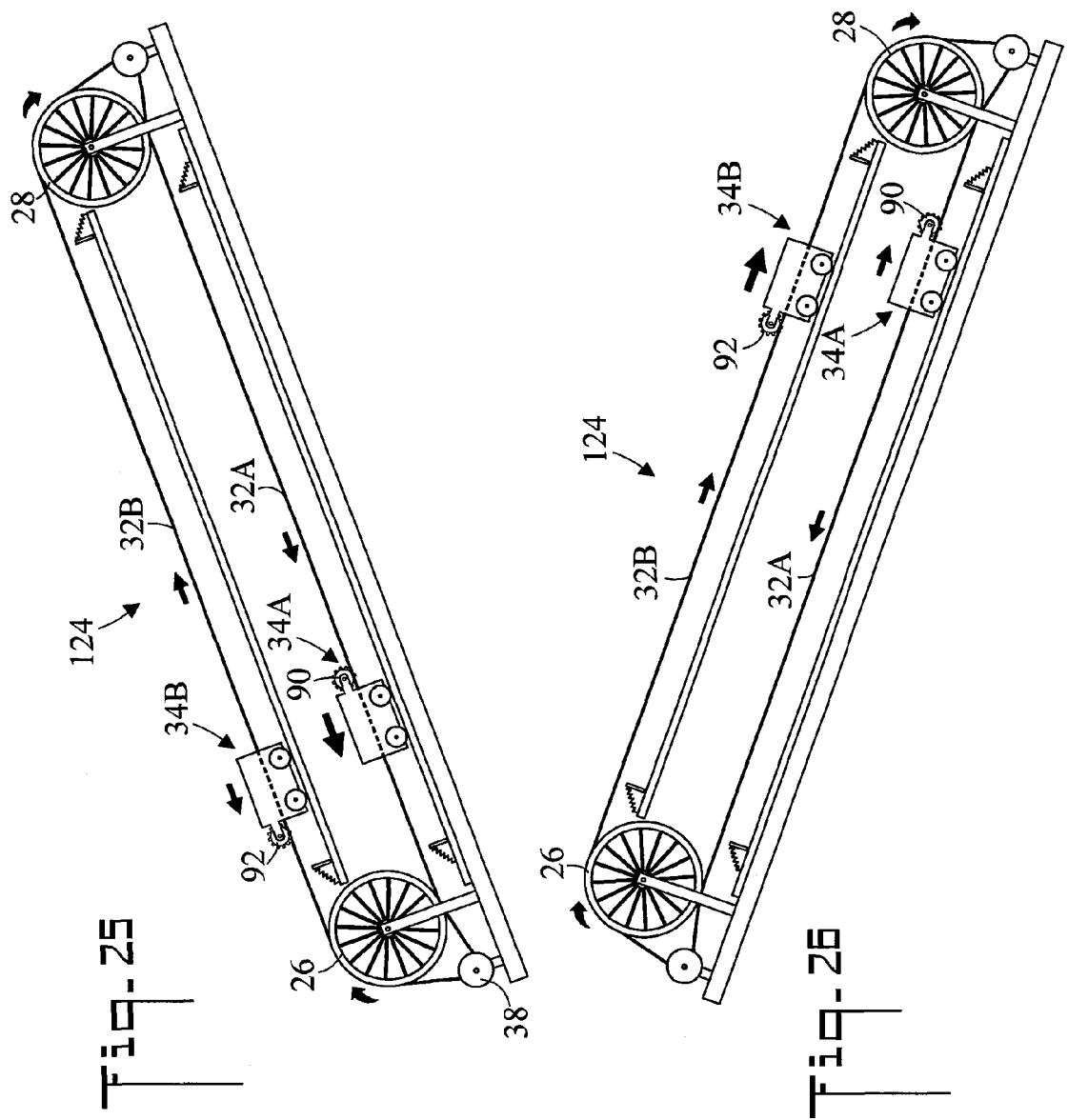

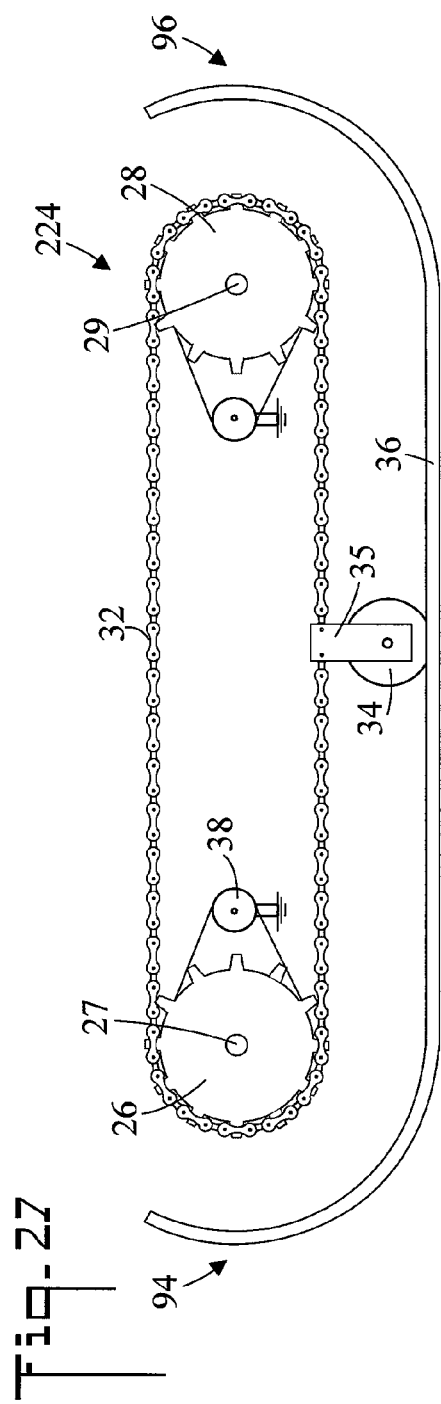
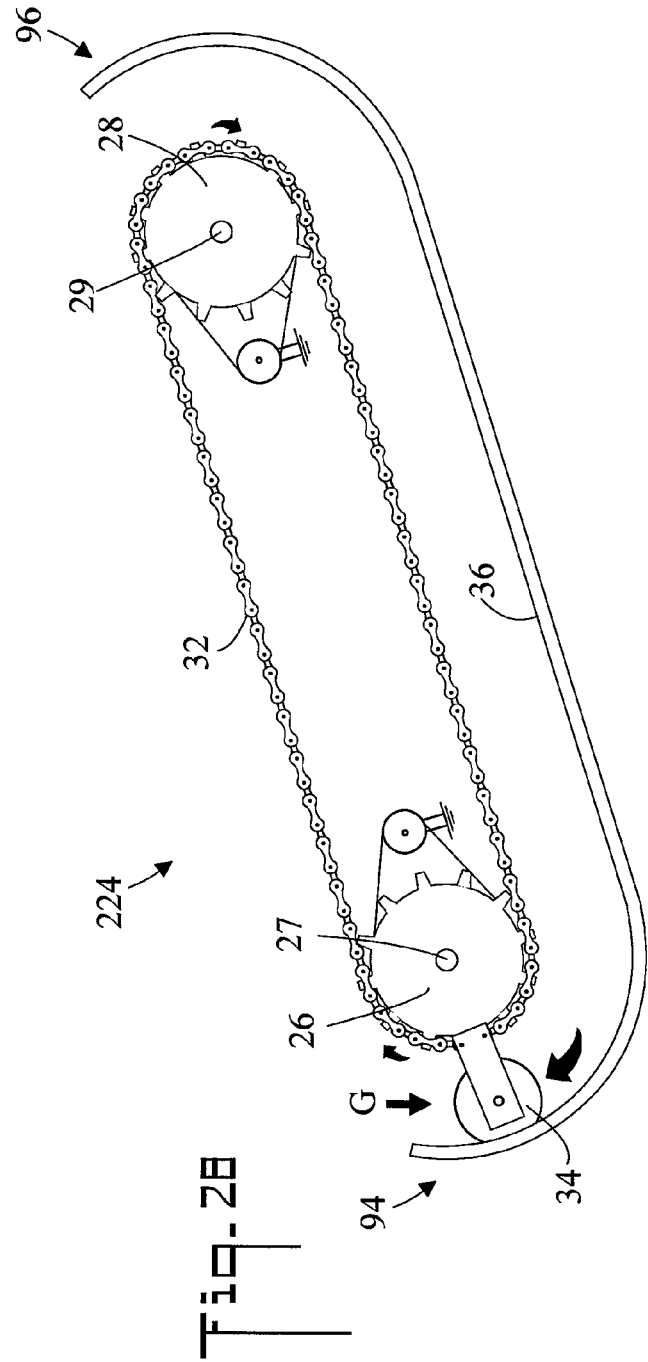

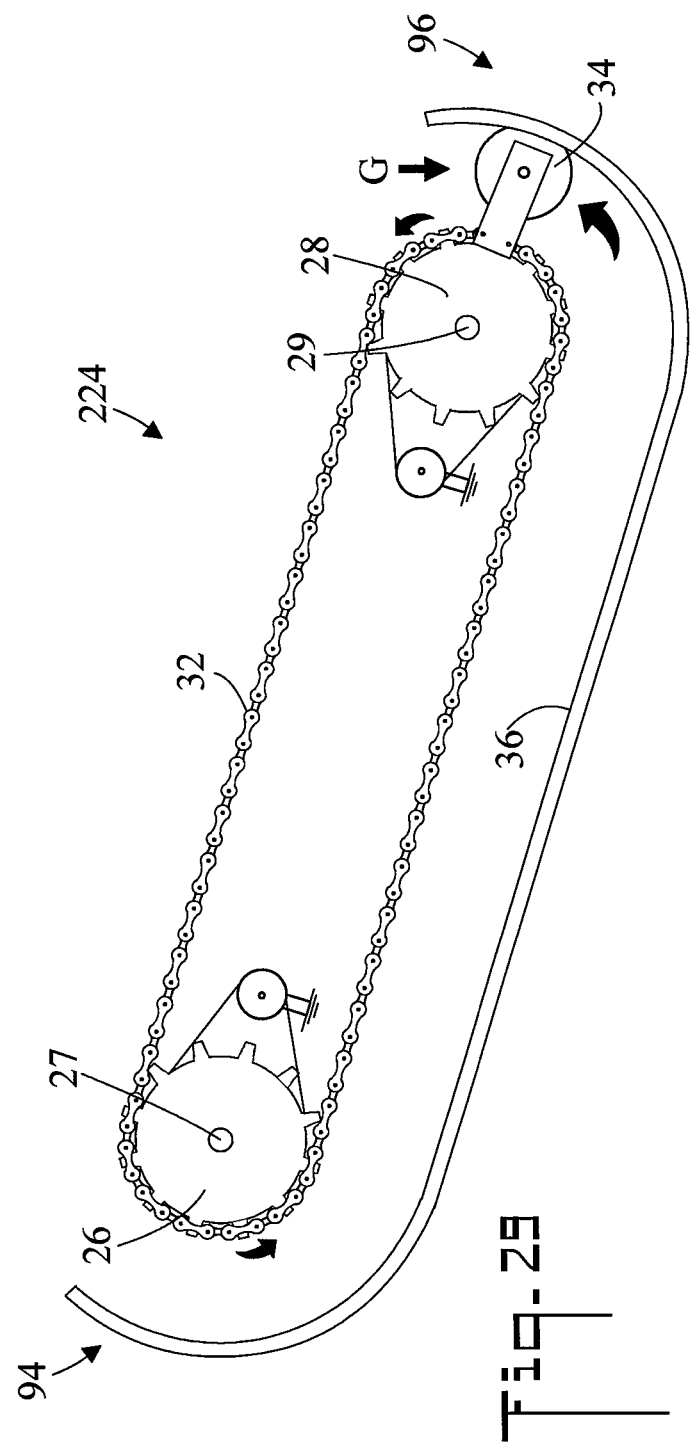

APPARATUS FOR CONVERTING WAVE MOTION ON A BODY OF WATER INTO ELECTRICAL POWER

CROSS REFERENCE TO RELATED APPLICATION

This application is a continuation-in-part of and claims the filing benefit under 35 U.S.C. §120 of U.S. application Ser. No. 14/465,899, filed Aug. 22, 2014, which is hereby incorporated by reference. Further, this application claims the filing benefit under 35 U.S.C. §119 of Canadian Application Number 2,829,362, filed Oct. 4, 2013, which is hereby incorporated by reference. Further, this application claims the filing benefit under 35 U.S.C. §119 of PCT Application Number PCT/CA2014/000720, filed Oct. 3, 2014, which is hereby incorporated by reference.

TECHNICAL FIELD

The present invention pertains generally to power generation, and more particularly to a fully enclosed floating power generating system which converts the kinetic energy of waves on a body of water into electrical energy.

BACKGROUND OF THE INVENTION

Systems which harness sea wave energy are known in the art. In one approach energy is generated when floating modules move up and down in response to wave action. In other systems the power generating mechanism uses the vertical motion inherent in the movement of waves to effect a corresponding displacement of a component of the generating system. Other systems utilize pendulums or the movement of fluid to generate power from wave motion. And still other systems utilize the tilting motion of a floating module to generate electrical power.

BRIEF SUMMARY OF THE INVENTION

The present invention is directed to apparatus for converting the energy of waves on a body of water into electrical power. The apparatus includes an electrical power generating system which is enclosed in a compact, sealed, waterproof floating container (module) which protects the components against the elements of water, wind, salt, ice, and floating debris. The electrical power generating system includes one or more electrical power generating units. The electrical power generating units employ a pair of spaced apart wheels having one or more rotatably connected electrical generators. The wheels are connected by a drive element which has a weight. When wave motion causes the electrical power generating unit to tilt, because of gravity the weight moves thereby turning the wheels and generator(s) and producing electrical power.

In an embodiment the electrical power generating unit is configured with two weights, only one of which is connected to the drive element at a given time, such that the drive element moves in only one direction, therefore causing the wheels to rotate in only one direction (e.g. clockwise or counterclockwise). This unidirectional movement is achieved by adding a switching mechanism to the weights. The switching mechanisms are complementary where one weight is engaged with the drive element while the other is disengaged (and visa versa). The action of the switching mechanisms produces a continuous, or near continuous, rotation of the wheels in one direction only.

In accordance with an embodiment, apparatus for converting wave motion on a body of water into electrical power comprises an electrical power generating system which includes a floatable housing. An electrical power generating unit is disposed within the floatable housing and includes a first wheel, a second wheel spaced apart from the first wheel, and a drive element which rotatably connects the first wheel and the second wheel, the drive element having a lower span and an upper span. A first switching mechanism (1) connects the first weight to the lower span of the drive element when the first weight moves toward the first wheel, and (2) disconnects the first weight from the lower span of the drive element when the first weight moves toward the second wheel. A second switching mechanism (1) connects the second weight to the upper span of the drive element when the second weight moves toward the second wheel, and (2) disconnects the second weight from the upper span of the drive element when the second weight moves toward the first wheel. An electrical generator is rotatably connected to the first wheel so that when the first wheel rotates the electrical generator rotates.

In accordance with another embodiment, the first and second switching mechanisms operating such that the drive element moves in a single direction.

In accordance with another embodiment, the drive element includes a drive chain. The first switching mechanism includes a first ratchet which meshes with the drive chain, and allows the first weight to move in one direction along the drive chain, but prevents first weight motion along the drive chain in the opposite direction. The second switching mechanism includes a second ratchet which meshes with the drive chain, and allows the second weight to move in one direction along the drive chain, but prevents second weight motion along the drive chain in the opposite direction In accordance with another embodiment, an additional switching mechanism (1) connects the first weight to the lower span of the drive element when the first weight moves toward the first wheel, and (2) disconnects the first weight from the lower span of the drive element when the first weight moves toward the second wheel.

In accordance with another embodiment, apparatus for converting wave motion on a body of water into electrical power comprises an electrical power generating system which includes a floatable housing. An electrical power generating unit is disposed within the floatable housing, and includes a first wheel, and a second wheel spaced apart from the first wheel. A drive element rotatably connects the first wheel and the second wheel. A weight is connected to the drive element. An electrical generator is rotatably connected to the first wheel so that when the first wheel rotates the electrical generator rotates. A track is disposed between the first wheel and the second wheel, the track has a first upturned section adjacent the first wheel, and a second upturned section adjacent the second wheel. The weight is movable along the track. When the first wheel becomes lower than the second wheel, the weight can move along the track and enter the first upturned section, and when the second wheel becomes lower than the first wheel, the weight can moves along the track and enter the second upturned section.

In accordance with another embodiment, the first wheel has a first axis, and the second wheel has a second axis. The first upturned section defines a first arc all points of which are equidistant from the first axis of the first wheel. The second upturned section defines a second arc all points of which are equidistant from the second axis of the second wheel.

In accordance with another embodiment, gravity causes the weight to slow down when it enters either the first upturned section or the second upturned section.

In accordance with another embodiment, the electrical power generating unit does not have a stop to stop motion of the weight.

Other embodiments, in addition to the embodiments enumerated above, will become apparent from the following detailed description, taken in conjunction with the accompanying drawings, which illustrate, by way of example, the principles of the apparatus.

BRIEF DESCRIPTION OF THE DRAWINGS

FIG. 1 is a top plan cutaway view of an electrical power generating system which converts wave motion on a body of water into electrical power;

FIG. 2 is a side elevation cutaway view of the system;

FIG. 3 is an enlarged top plan view of an electrical power generating unit;

FIG. 4 is a side elevation view of the electrical power generating unit:

FIG. 5 is an end elevation view of the electrical power generating unit:

FIG. 6 is an enlarged view of area 6 of FIG. 3;

FIG. 7 is an enlarged view of area 7 of FIG. 4;

FIG. 8 is an enlarged view of FIG. 5;

FIG. 13 is a reduced side elevation cutaway view of the system being tilted by wave motion;

FIG. 14 is another reduced side elevation cutaway view of the system being tilted by wave motion;

FIG. 15 is a reduced perspective view of two electrical power generating systems connected together;

FIG. 16 is an enlarged view of area 16-16 of FIG. 15;

FIG. 17 is a reduced side elevation view of the two electrical power generating systems being tilted by wave motion;

FIG. 18 is a reduced top plan view of an array of electrical power generating systems;

FIG. 19 is a reduced top plan view of another array of electrical power generating systems;

FIG. 20 is a reduced side elevation view of two stacked electrical power generating systems;

FIG. 21 is a side elevation view of a second embodiment of the electrical power generating unit;

FIG. 22 is an enlarged view of area 22 of FIG. 21;

FIG. 23 is another view of FIG. 22;

FIG. 24 is a view of two switching mechanisms connecting a first weight to a drive element;

FIG. 25 is a side elevation view of the electrical power generating unit being tilted by wave motion;

FIG. 26 is another side elevation view of the electrical power generating unit being tilted by wave motion;

FIG. 27 is a side elevation view of a third embodiment of the electrical power generating unit;

FIG. 28 is a side elevation view of the electrical power generating unit of FIG. 27 being tilted by wave motion; and, FIG. 29 another side elevation view of the electrical power generating unit of FIG. 27 being tilted by wave motion.

DETAILED DESCRIPTION OF THE INVENTION

Figure 11:
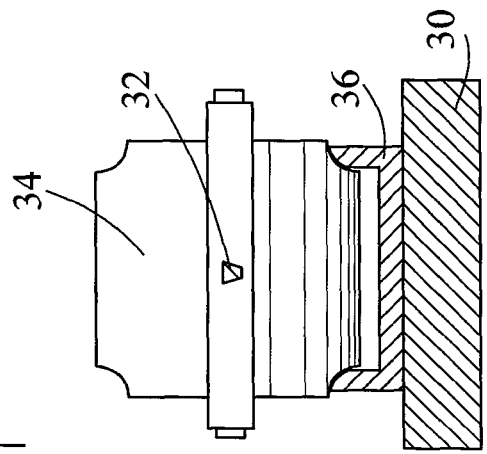
FIG. 11 is a cross sectional view along the line 11-11 of FIG. 4.
Figure 9:
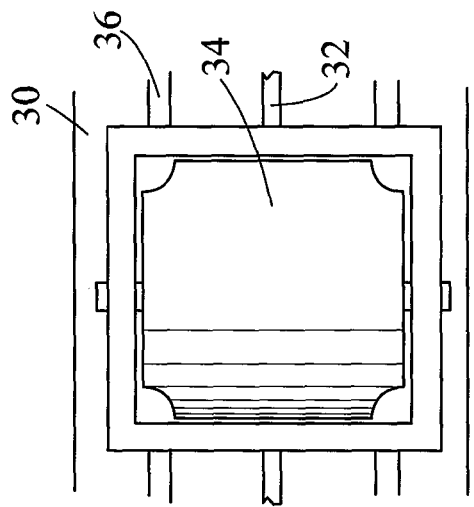
FIG. 9 is is an enlarged view of area 9 of FIG. 3.
Figure 10:
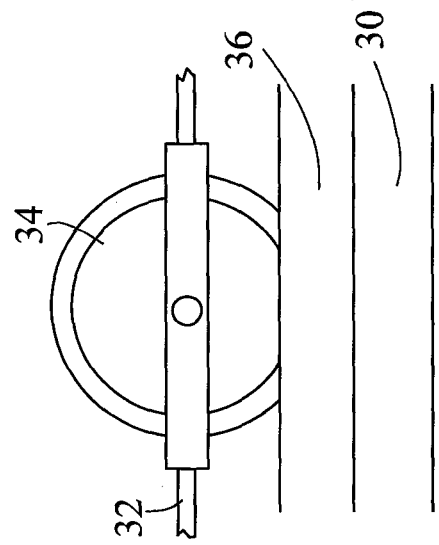
FIG. 10 is an enlarged view of area 10 of FIG. 4.

Referring initially to FIGS. 1 and 2, there is illustrated apparatus for converting wave motion on a body of water 500 to electrical power. The apparatus includes an electrical power generating system, generally designated as 20. Also referring to FIGS. 3-11, electrical power generating system 20 includes a watertight floatable housing 22 which floats on a body of water 500 such as an ocean, lake, etc. An electrical power generating unit 24 is disposed within floatable housing 22. Electrical power generating unit 24 includes a first wheel 26 which is spaced apart from a second wheel 28. In the shown embodiment, first 26 and second 28 wheels are pulleys, however other elements such as gears and sprockets could also be utilized. Also in the shown embodiment, wheels 26 and 28 are fixedly connected to a base 30 which is in turn fixedly connected to floatable housing 22. A drive element 32 rotatably connects first wheel 26 and second wheel 28. Drive element 32 is a continuous band which is looped around first wheel 26 and second wheel 28 so that as drive element 32 moves (rotates) wheels 26 and 28 rotate. In the shown embodiment drive element 32 is a belt which rotates first wheel 26 and second wheel 28 which are pulleys. It may be appreciated however that drive element 32 could also be a rope, cable, chain, etc.

A weight 34 is connected to drive element 32. In the shown embodiment, a track 36 is disposed between first wheel 26 and second wheel 28. Weight 34 includes a roller which is shaped and dimensioned to roll along track 36. As such, through the action of gravity weight 34 is free to bi-directionally move along track 36 either toward first wheel 26 or toward second wheel 28. The roller and track design minimizes stress and strain on drive element 32.

An electrical generator 38 is rotatably connected to first wheel 26 so that when first wheel 26 rotates the rotor of generator 38 also rotates. In the shown embodiment, a second generator 40 is also rotatably connected to first wheel 26, and at least one generator is connected to second wheel 28. As shown, two generators third generator 42 and fourth generator 44 are connected to second wheel 28. In an embodiment, generator 38 (and 40, 42, and 44) are alternators.

Also referring to FIGS. 13 and 14, when floatable housing 22 is placed in body of water 500 the wave motion causes electrical power generating system 20 to tilt so that one of first wheel 26 and second wheel 28 becomes lower (closer to the center of the earth) than the other of first wheel 26 and second wheel 28. In FIG. 13 the tilting has caused first wheel 26 to be lower than second wheel 28, and in FIG. 14 the tilting has caused second wheel 28 to be lower than first wheel 26. When system 20 is so tilted, because of gravity weight 34 moves toward the lower wheel which in turn causes drive element 32 to rotate (about axis 33), which in turn causes first wheel 26 to rotate (about axis 27), which in turn causes generator 38 to rotate (about axis 39) and produce electrical power (also refer to FIGS. 3 and 4). It is further noted that the tilting further causes second wheel 28 to rotate (about axis 29), second generator 40 to rotate (about axis 39) and produce electrical power, and third and fourth generators 42 and 44 respectively to rotate (about axis 43) and produce electrical power. In FIG. 13 the rotation of drive element 32, wheels 26 and 28, and generator(s) 38 (and 40), and 42 (and 44) are all clockwise, and in FIG. 14 the rotation is counterclockwise. The direction of rotation of drive element 32 is shown by the two arrows. In an embodiment, generator 38 (and 40, 42, and 44) produce electrical power in both rotational directions.

Track 36 has a first end disposed near first wheel 26, and a second end disposed near second wheel 28. A first stop 46 is disposed at the first end of track 36 for preventing roller 34 from striking first wheel 26, and a second stop 48 is disposed at the second end of track 36 for preventing roller 34 from striking second wheel 28. The maximum excursion of roller 34 is shown in dashed lines in FIGS. 4, 13 and 14.

Referring specifically to FIGS. 6 and 8, a second generator 40 is rotatably connected to first wheel 26. First wheel 26 includes a middle pulley 50 and two end pulleys 52 and 54. That is, first wheel 26 consists of three pulleys which are axially connected together (such as by welding). Drive element 32 is connected to middle pulley 50. First generator 38 is rotatably connected to one end pulley (52 as shown), and second generator 40 is rotatably connected to the other of end pulley (54 as shown). The connection of pulley 52 to first generator 38 is effected by a first generator drive element 56 (such as a belt, rope, cable, chain etc.), and the connection of pulley 54 to second generator 40 is effected by a second generator drive element 58.

Figure 12:
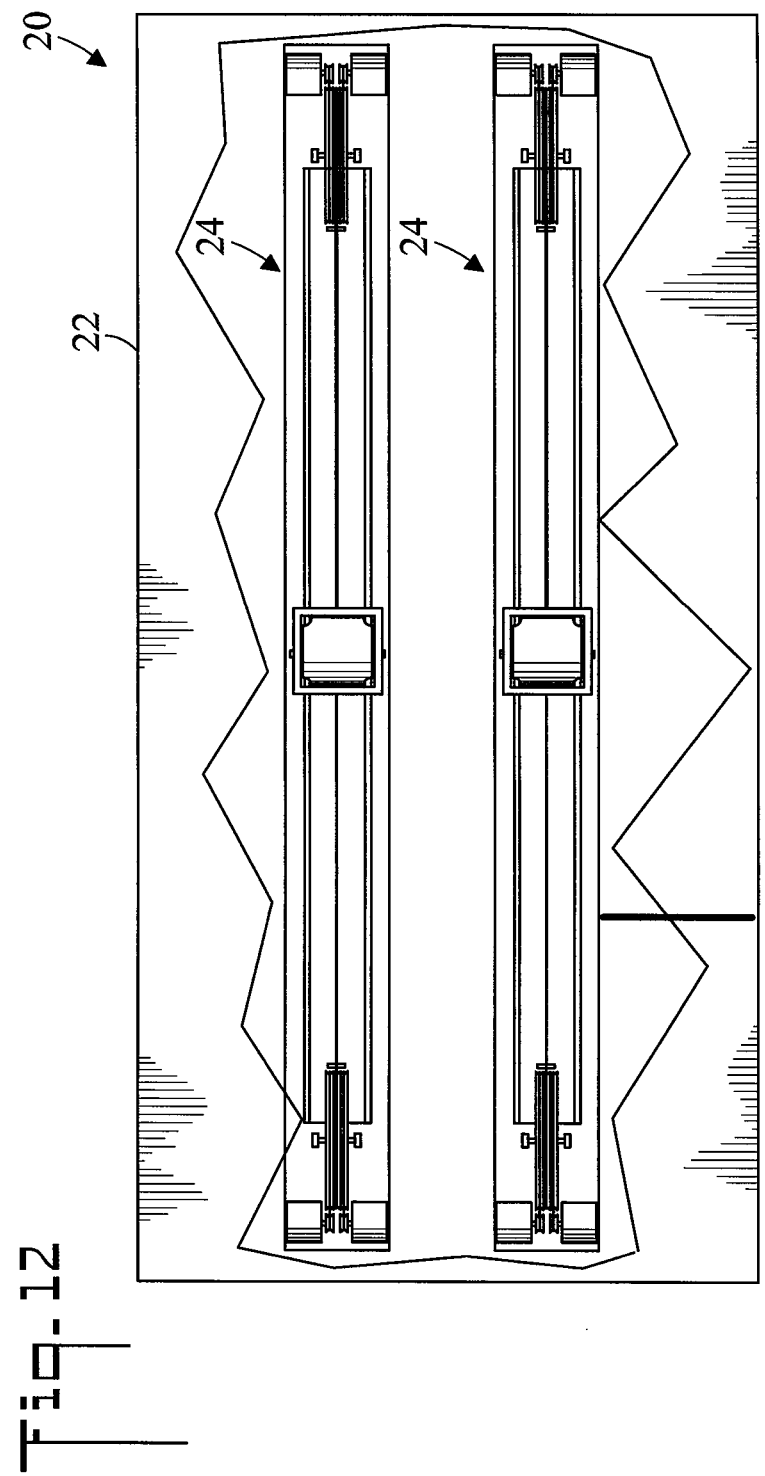
FIG. 12 is a top plan view of the system with a plurality of electrical power generating units.

FIG. 12 is a top plan view of electrical power generating system 20 with a plurality of electrical power generating units 24. It may be appreciated that other embodiments could include three or more electrical power generating units 24.

Again referring to FIGS. 13 and 14, floatable housing 22 includes a sealed output port 60 which routes the power output of power generating unit 24 through an electrical cable 62 to a remote location, typically on shore. In one embodiment the electrical cable is run along an anchor line 64 which anchors floatable housing 22 to the floor of the body of water.

FIG. 15 is a reduced perspective view of two electrical power generating systems 20 and 20A connected together, FIG. 16 is an enlarged view of area 16-16 of FIG. 15, and FIG. 17 is a reduced side elevation view of the two connected electrical power generating systems 20 and 20A being tilted by wave motion. Electrical power generating system 20 is connected to a second electrical power generating system 20A by a connector 66. Connector 66 prevents electrical power generating systems 20 and 20A from both drifting apart and colliding, and can be used to form an array of electrical power generating systems 20 (refer to FIGS. 18 and 19). In the shown embodiment, connector 66 is an elongated member such as a flexible beam made from rubber or other resiliently bendable material. In the shown embodiment, electrical power generating system 20 and electrical power generating system 20A each have a connector receiving station 68 which removably receives one end of connector 66. Connector receiving station 68 includes a pivot axis 70 about which connector 66 can rotate (in a generally vertical plane). The rotation capability coupled with the flexibility of connector 66, ensures that electrical power generating system 20 and second electrical power generating system 20A can move with respect to each other during wave motion as is shown in FIG. 17. It is noted that in the shown embodiment, connector receiving station 68 is disposed about half way between the top and bottom of floatable housings 22 and 22A.

Still referring to FIG. 15, it is also noted that electrical power generating system 20 and second electrical power generating system 20A each have a plurality of connector receiving stations 68 disposed around their perimeters. This facilitates the connection of electrical power generating systems 20 into arrays such as shown in FIGS. 18 and 19, and also permits array reconfiguration, and electrical power generating system 20 replacement in the event of failure.

FIG. 18 is a reduced top plan view of an array of electrical power generating systems 20 which are connected by connectors 66 which are connected to connector receiving stations 68. A plurality of electrical power generating systems 20 are connected to form the array of electrical power generating systems. Each electrical power generating system 20 of the array of electrical power generating systems has a longitudinal axis 80 along which power generating unit 24 is disposed (refer also to FIGS. 1 and 2). The array of electrical power generating systems is arranged so that longitudinal axis 80 of an electrical power generating system 20 is oriented parallel with the longitudinal axis of an adjacent electrical power generating system 20. For example, it is noted that the longitudinal axis 80 of electrical power generating system 20A is parallel to the longitudinal axis 80 of adjacent electrical power generating system 20B. It is further noted that the longitudinal axis 80 of electrical power generating system 20A is collinear with the longitudinal axis 80 of adjacent electrical power generating system 20C, which for the purposes of this discussion is also parallel.

FIG. 19 is a reduced top plan view of another array of electrical power generating systems. In this case, the array of electrical power generating systems is arranged so that longitudinal axis 80 of an electrical power generating system 20 is oriented perpendicular to the longitudinal axis of an adjacent electrical power generating system 20. For example, it is noted that the longitudinal axis 80 of electrical power generating system 20A is perpendicular to the longitudinal axes 80 of adjacent electrical power generating systems 20B and 20C. This perpendicular relationship ensures that electrical power will be generated for tilting wave motion in either directions 82 or 84. For wave motion in direction 82, electrical power generating systems 20A and 20D will generate the most electrical power, while for wave motion in direction 84, electrical power generating systems 20B and 20C will generate the most power.

FIG. 20 is a reduced side elevation view of two stacked electrical power generating systems. Second electrical power generating system 20A is stacked on top of electrical power generating system 20. Because of the increased height, the motion of weight 34 (refer to FIGS. 1 and 2) in second electrical power generating system 20A is amplified, and thereby more electrical power is generated. The two tilted systems are shown in dashed lines. Also, stacking permits more electrical power generating systems 20 to be placed in a given area.

Referring now to FIG. 21, there is illustrated a side elevation view of a second embodiment of the electrical power generating unit, generally designated as 124. FIG. 22 is an enlarged view of area 22 of FIG. 21, and FIG. 23 is another view of FIG. 22. Electrical power generating unit 124 is the same as previously described electrical generating unit 24, except two modified weights, first weight 34A and second weight 34B are utilized. It may be appreciated that as previously described electrical power generating unit 124 is disposed within floatable housing 22, and is part of electrical power generating system 20 as previously described (refer to FIGS. 1-14). Electrical power generating unit 124 includes a first wheel 26 which is spaced apart from a second wheel 28. A drive element 32 rotatably connects first wheel 26 and said second wheel 28. Drive element 32 has a lower span 32A and an upper span 32B. Lower span 32A is defined as the section of drive element 32 which extends from the bottom of first wheel 26 to the bottom of second wheel 28, and upper span 32B is defined as the section of drive element 32 which extends from the top of first wheel 26 to the top of second wheel 28.

A first switching mechanism 90 (1) connects first weight 34A to lower span 32A of drive element 32 when first weight 34A moves toward first wheel 26, and (2) disconnects first weight 34A from lower span 32A of drive element 32 when first weight 34A moves toward second wheel 28. That is, when first weight 34A moves toward first wheel 26, first switching mechanism 90 connects first weight 34A and lower span 32A of drive chain 32 together so that first weight 34A causes drive element 32 to move (rotate) and turn first 26 and second 28 wheels (refer also to FIG. 25 and the associated discussion). Conversely, when first weight 34A moves in the opposite direction toward second wheel 28, first switching mechanism 90 disconnects first weight 34A from lower span 32A of drive element 32 thereby allowing first weight 34A to freely move along drive element 32 and fall toward second wheel 28 (refer also to FIG. 26 and the associated discussion). In FIG. 22 connection to drive element 32 is indicated by a large arrow, and in FIG. 23 disconnection from drive element 32 is indicated by a small arrow. Similarly, a second switching mechanism 92 (1) connects second weight 34B to upper span 32B of drive element 32 when second weight 34B moves toward second wheel 28, and (2) disconnects second weight 34B from upper span 32B of drive element 32 when second weight 34B moves toward first wheel 26.

Referring to FIGS. 22 and 23, in the shown embodiment drive element 32 includes a drive chain. First switching mechanism 90 includes a first ratchet in the form of a sprocket wheel which meshes with drive chain and allows first weight 34A to freely move along the drive chain in one direction (right as shown in FIG. 23), but prevents first weight 34A from moving along the drive chain in an opposite direction (left as shown in FIG. 22). That is, in FIG. 22 when first weight 34A and connected first switching mechanism 90 move to the left (i.e. toward first wheel 26, refer to FIG. 21) the sprocket wheel does not turn (is locked), and therefore the drive chain is moved to the left which turns first 26 and second 28 wheels. Conversely, in FIG. 23 when first weight 34A and connected first switching mechanism 90 move to the right (i.e. toward second wheel 28, refer to FIG. 21) the sprocket turns so that first weight 34A can freely move along the drive chain. Similarly, second switching mechanism 92 includes a second ratchet in the form of a sprocket wheel which meshes with drive chain and allows second weight 34B to move along the drive chain in one direction (left as shown in FIG. 21), but prevents second weight 34B from moving along the drive chain in an opposite direction (right as shown in FIG. 21). The operation of first switching mechanism 90 and second switching mechanism 92 are reversed, wherein first switching mechanism 90 connects to the drive chain (does not turn) when moving in one direction (left as shown), and second switching mechanism 92 connects to the drive chain (does not turn) when moving in the opposite direction (right as shown).

Though not shown, in this embodiment first 26 and second wheels 28 are also sprockets which engage the drive chain. Further, it may be appreciated that other switching mechanisms 90 and 92 could be utilized. For example, the switching mechanisms could be clamps which selectively (1) clamp first weight 34A and second weight 34B to drive element 32, and (2) unclamp first weight 34A and second weight 34B from drive element 32. Also, as shown first weight 34A and second weight 34B have wheels which allow them to move between first wheel 26 and second wheel 28.

FIG. 24 is a view of two switching mechanisms 90 connecting first weight 34A to a drive element 32. This embodiment serves to form a better mechanical connection to drive element 32. An additional switching mechanism 90 (1) connects first weight 34A to lower span 32A of drive element 32 when first weight 24A moves toward first wheel 26, and (2) disconnects first weight 34A from lower span 32A of drive element 32 when first weight 34A moves toward second wheel 28 (also refer to FIG. 21). It may be appreciated that an additional second switching mechanism 92 could also be added to second weight 34B.

FIG. 25 is a side elevation view of electrical power generating unit 124 being tilted by wave motion, and FIG. 26 is another side elevation view of electrical power generating unit 124 being tilted by wave motion in an opposite direction (also refer to FIGS. 13 and 14). As with embodiment 24, electrical power generating unit 124 includes an electrical generator 38 which is rotatably connected to first wheel 26 so that when first wheel 26 rotates generator 38 rotates. When the electrical power generating system is placed in the body of water the wave motion causes electrical power generating unit 124 to tilt so that one of first wheel 26 and second wheel 28 becomes lower than the other of first wheel 26 and second wheel 28, first 34A and second 34B weights move toward the lower wheel, wherein only one of weights 34A and 34B is connected to drive element 32 and causes drive element 32 to move (rotate), which causes first wheel 26 to rotate, which causes generator 38 to rotate and produce electrical power.

In FIG. 25 electrical power generating unit 124 tilts to the left. This causes both first weight 34A and second weight 34B via gravity to move toward first wheel 26. First switching mechanism 90 connects first weight 34A to lower span 32A of drive element 32 thereby causing drive element 32 to move and turn first wheel 26 and second wheel 28 in a clockwise direction as shown. At the same time, second switching mechanism 92 disconnects second weight 34B from upper span 32B of drive element 32, so that second weight 34B freely travels along drive element 32 toward first wheel 26. Conversely, in FIG. 26, electrical power generating unit 124 tilts to the right. This causes both first weight 34A and second weight 34B via gravity to move toward second wheel 28. Second switching mechanism 92 connects second weight 34B to the upper span 32B of drive element 32 thereby causing drive element 32 to move and turn first wheel 26 and second wheel 28 in a clockwise direction as shown. At the same time, first switching mechanism 90 disconnects first weight 34A from lower span 32A of drive element 32, so that first weight 34A freely travels along drive element 32 toward second wheel 28. In other words, the first 90 and second 92 switching mechanisms operate such that said drive element moves in a single direction (clockwise as shown). In this manner, continuous—or nearly continuous—rotational motion is produced in one direction, providing operating efficiencies and reducing component costs or complexity in the apparatus Referring now to FIG. 27, there is illustrated a side elevation view of a third embodiment of the electrical power generating unit, generally designated as 224. It may be appreciated that power generating unit 224 is disposed within a floatable housing 22, and is part of electrical power generating system 20 as previously described (refer to FIGS. 1-14). Electrical power generating unit 224 includes a first wheel 26 and a second wheel 28 which is spaced apart from first wheel 26. A drive element 32 rotatably connects first wheel 26 and said second wheel 28. In the shown embodiment first 26 and second 28 wheels are sprockets which cooperate with drive element 32 which is a chain. A weight 34 is connected to drive element 32. In the shown embodiment two brackets 35 (one hidden) connect weight 34 which is a roller to the outside of one link of the chain so as not to interfere with the sprocket engagement of first and second wheels 26 and 28. An electrical generator 38 is rotatably connected to first wheel 26 so that when first wheel 26 rotates electrical generator 38 rotates. A track 36 is disposed between first wheel 26 and second wheel 28. Track 38 has a first upturned section 94 adjacent first wheel 26, and a second upturned section 96 adjacent second wheel 28. "Upturned" means that track 36 bends up in a circular arc at its ends. The length of upturned sections 94 and 96 is selected so as not to permit weight 34 from exiting track 36. In the shown embodiment, weight 34 is movable along track 36 as was previously shown in FIG. 11 and the associated discussion. When the electrical power generating system 20 is placed in the body of water 500 the wave motion causes electrical power generating unit 224 to tilt so that one of first wheel 26 and second wheel 28 becomes lower than the other of first wheel 26 and second wheel 28. Weight 34 moves toward the lower wheel, which causes drive element 32 to rotate, which causes first wheel 26 to rotate, which causes electrical generator 38 to rotate and produce electrical power. When first wheel 26 becomes lower than second wheel 28, weight 34 can move along track 36 and enter first upturned section 94, and when second wheel 28 becomes lower than first wheel 26, weight 34 can move along track 36 and enter second upturned section 96 (refer also to FIGS. 28 and 29). It may be appreciated that in order for weight 34 to enter either first upturned section 94 or second upturned section 96. the size and period of the wave motion must be of sufficient magnitude. In other words, for very small and rapid waves, weight 34 could continuously reside in the straight part of track 36.

It is noted that first wheel 26 has a first axis 27, and second wheel 28 has a second axis 29. First upturned section 94 defines a first arc all points of which are equidistant from first axis 27 of first wheel 26. Similarly, second upturned section 96 defines a second arc all points of which are equidistant from second axis 29 of second wheel 28.

FIG. 28 is a side elevation view of electrical power generating unit 224 being tilted by wave motion so that first wheel 26 is lower than second wheel 28. It is noted that weight 34 travels along first upturned section 94. Gravity G causes weight 34 to slow down when it enters first upturned section 94. It is further noted that electrical power generating unit 224 does not having a stop to stop motion of weight 34. As such, weight 34 travels a further distance and more electrical power is produced.

FIG. 29 is a side elevation view of electrical power generating unit 224 being tilted by wave motion so that second wheel 28 is lower than first wheel 26. It is noted that weight 34 travels along second upturned section 96. Gravity G causes weight 34 to slow down when it enters second upturned section 96. It is further noted that electrical power generating unit 224 does not having a stop to stop motion of weight 34. As such, weight 34 travels a further distance and more electrical power is produced.

The embodiments of the apparatus described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus should be construed as limiting the invention to a particular embodiment or combination of embodiments. The scope of the invention is defined by the appended claims.

I claim:

1. An apparatus for converting wave motion on a body of water into electrical power, comprising:
   an electrical power generating system including:
      a floatable housing;
      an electrical power generating unit disposed within said floatable housing, said electrical power generating unit including:
         a first wheel;
         a second wheel spaced apart from said first wheel;
         a drive element rotatably connecting said first wheel and said second wheel;
         a weight connected to said drive element;
         an electrical generator rotatably connected to said first wheel so that when said first wheel rotates said electrical generator rotates;
         a track disposed between said first wheel and said second wheel, said track having a first upturned section adjacent said first wheel, and a second upturned section adjacent said second wheel;
         said weight movable along said track; and,
      wherein said electrical power generating unit is configured to tilt due to wave motion such that one of said first wheel and said second wheel becomes lower than the other of said first wheel and said second wheel, said weight moving along said track and entering said first upturned section when said first wheel becomes lower than said second wheel, and said weight moving along said track and entering said second upturned section when said second wheel becomes lower than said first wheel;
   said electrical power generating unit not having a stop to stop motion of said weight.

2. An apparatus for converting wave motion on a body of water into electrical power, comprising:
   an electrical power generating system including:
      a floatable housing;
      an electrical power generating unit disposed within said floatable housing, said electrical power generating unit including:
         a first wheel;
         a second wheel spaced apart from said first wheel;
         a drive element rotatably connecting said first wheel and said second wheel;
         a weight connected to said drive element;
         an electrical generator rotatably connected to said first wheel so that when said first wheel rotates said electrical generator rotates;
         a track disposed between said first wheel and said second wheel, said track having a first upturned section adjacent said first wheel, and a second upturned section adjacent said second wheel;
         said weight movable along said track; and,
      wherein said electrical power generating unit is configured to tilt due to wave motion such that one of said first wheel and said second wheel becomes lower than the other of said first wheel and said second wheel, said weight moving along said track and entering said first upturned section when said first wheel becomes lower than said second wheel, and said weight moving along said track and entering said second upturned section when said second wheel becomes lower than said first wheel;

said first wheel having a first axis, and said second wheel having a second axis;

said first upturned section defining a first arc all points of which are equidistant from said first axis of said first wheel; and, said second upturned section defining a second arc all points of which are equidistant from said second axis of said second wheel.

3. An apparatus for converting wave motion on a body of water into electrical power, comprising:
- an electrical power generating system including:
  - a floatable housing;
  - an electrical power generating unit disposed within said floatable housing, said electrical power generating unit including:
    - a first wheel;
    - a second wheel spaced apart from said first wheel;
    - a drive element rotatably connecting said first wheel and said second wheel, said drive element having a lower span and an upper span;
    - a first weight which is connectable to said lower span;
    - a second weight which is connectable to said upper span;
    - a first switching mechanism which (1) connects said first weight to said lower span of said drive element when said first weight moves toward said first wheel, and (2) disconnects said first weight from said lower span of said drive element when said first weight moves toward said second wheel;
    - a second switching mechanism which (1) connects said second weight to said upper span of said drive element when said second weight moves toward said second wheel, and (2) disconnects said second weight from said upper span of said drive element when said second weight moves toward said first wheel; and,
    - an electrical generator rotatably connected to said first wheel so that when said first wheel rotates said electrical generator rotates; and,
    - an additional switching mechanism which (1) connects said first weight to said lower span of said drive element when said first weight moves toward said first wheel, and (2) disconnects said first weight from said lower span of said drive element when said first weight moves toward said second wheel.

* * * * *